United States Patent
Kohara

(10) Patent No.: US 10,981,417 B2
(45) Date of Patent: Apr. 20, 2021

(54) PNEUMATIC TIRE WITH CARCASS PLY COMPRISING PLURALITY OF PARTLY OVERLAPPING STRIP-SHAPED PLY PIECES

(71) Applicant: SUMITOMO RUBBER INDUSTRIES, LTD., Kobe (JP)

(72) Inventor: Kei Kohara, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 769 days.

(21) Appl. No.: 15/552,134

(22) PCT Filed: Mar. 7, 2016

(86) PCT No.: PCT/JP2016/056997
§ 371 (c)(1),
(2) Date: Aug. 18, 2017

(87) PCT Pub. No.: WO2016/143742
PCT Pub. Date: Sep. 15, 2016

(65) Prior Publication Data
US 2018/0037062 A1 Feb. 8, 2018

(30) Foreign Application Priority Data

Mar. 11, 2015 (JP) .............................. JP2015-047849

(51) Int. Cl.
*B60C 9/08* (2006.01)
*B60C 9/04* (2006.01)
(Continued)

(52) U.S. Cl.
CPC ............... *B60C 9/023* (2013.01); *B60C 9/02* (2013.01); *B60C 9/04* (2013.01); *B60C 9/08* (2013.01);
(Continued)

(58) Field of Classification Search
CPC ............... B29D 30/305; B29D 30/165; B29D 2030/423; B29D 30/42; Y10T 156/906;
(Continued)

(56) References Cited

U.S. PATENT DOCUMENTS

2011/0146887 A1* 6/2011 Downing
2015/0328929 A1* 11/2015 Sugiyama ............... B60C 9/023

FOREIGN PATENT DOCUMENTS

EP 2810792 A1 12/2014
EP 3 090 885 A1 * 11/2016
(Continued)

OTHER PUBLICATIONS

English machine translation of JP 2010-208090 A, Sep. 24, 2010.*
English machine translation of JP 2012-86534 A, May 10, 2012.*
International Search Report, issued in PCT/JP2016/056997, PCT/ISA/210, dated May 31, 2016.
(Continued)

*Primary Examiner* — Adrienne C. Johnstone
(74) *Attorney, Agent, or Firm* — Birch, Stewart, Kolasch & Birch, LLP

(57) ABSTRACT

A pneumatic tire 1 comprises a carcass 6 comprising at least one carcass ply 6A extending between bead portions 4 via sidewall portions 3 and a tread portion 2. The carcass ply 6A comprises strip-shaped ply pieces 11 longer in a tire radial direction than in a tire circumferential direction arranged circumferentially. Each of the ply pieces 11 comprises a plurality of carcass cords 12 arranged in parallel in the tire radial direction and at least partly overlapping each other with the ply pieces 11 circumferentially adjacent. At least one of the carcass cords 12 arranged in at least one of side edge portions 11e in the tire circumferential direction of each of the ply pieces 11 having a diameter (Ce) smaller than a diameter (Cc) of at least one of the carcass cords 12 arranged in a center portion 11c of each of the ply pieces 11.

8 Claims, 8 Drawing Sheets

(51) Int. Cl.
*B60C 9/02* (2006.01)
*B29D 30/16* (2006.01)
*B29D 30/42* (2006.01)

(52) U.S. Cl.
CPC ............ *B29D 30/165* (2013.01); *B29D 30/42* (2013.01); *B29D 2030/423* (2013.01); *B60C 2009/0261* (2013.01); *B60C 2009/0408* (2013.01); *B60C 2009/0425* (2013.01); *B60C 2009/0441* (2013.01); *B60C 2009/0483* (2013.01); *Y10S 156/906* (2013.01)

(58) Field of Classification Search
CPC ................ Y10T 156/907; B60C 9/023; B60C 2009/0408; B60C 2009/0483; B60C 2009/0261; B60C 9/02; B60C 9/04; B60C 9/08; B60C 2009/0441; B60C 2009/0425
USPC ........................................ 156/134, 906, 907
See application file for complete search history.

(56) References Cited

FOREIGN PATENT DOCUMENTS

| | | | |
|---|---|---|---|
| EP | 3 106 321 A1 | * | 12/2016 |
| JP | 5-24607 A | | 9/1993 |
| JP | 5-238203 A | | 9/1993 |
| JP | 2007099088 A | * | 4/2007 |
| JP | 2009-113591 A | | 5/2009 |
| JP | 2009113615 A | * | 5/2009 |
| JP | 2010208090 A | * | 9/2010 |
| JP | 2012-86534 A | | 5/2012 |
| JP | 2014-69335 A | | 4/2014 |
| WO | WO-2013/125117 A1 | * | 8/2013 |
| WO | WO 2014/135995 A2 | | 9/2014 |

OTHER PUBLICATIONS

Written Opinion of the International Searching Authority, issued in PCT/JP2016/056997, PCT/ISA/237, dated May 31, 2016.
Extended European Search Report, dated Oct. 15, 2018, for European Application No. 16761710.9.

* cited by examiner

PNEUMATIC TIRE WITH CARCASS PLY COMPRISING PLURALITY OF PARTLY OVERLAPPING STRIP-SHAPED PLY PIECES

TECHNICAL FIELD

The present invention relates to a pneumatic tire capable of suppressing occurrence of poor appearance.

BACKGROUND ART

For example, Japanese Unexamined Patent Application Publication No. 2014-069335 has disclosed a method for manufacturing a pneumatic tire having a rigid core. The rigid core has an outer surface substantially corresponding to a shape of a surface of a cavity of the tire. On an outer surface of the rigid core, strip-shaped ply pieces are sequentially stuck in a tire circumferential direction. Thereby, a toroidal carcass ply is formed on the outer surface of the rigid core. Thereafter, other tire components are attached to form a green tire. This green tire is vulcanized together with the rigid core. Therefore, according to such a manufacturing method, the carcass ply is not expanded and deformed.

Length in a tire radial direction of each of the ply pieces is greater than a length thereof in the tire circumferential direction. Further, each of the ply pieces is provided with a plurality of carcass cords arranged in parallel with the tire radial direction. The carcass cords have same diameters and are arranged with equal pitches therebetween in the tire circumferential direction.

It is possible that the pneumatic tire formed by the above manufacturing method suppress variation of the pitches between the carcass cords in the tire circumferential direction as compared with a conventional method in which a cylindrical carcass ply is expanded and deformed to form a toroidal shape, for example. Thereby, it is possible that uniformity of the tire is improved.

SUMMARY OF THE INVENTION

By the way, an outer surface of the rigid core has a length in the tire circumferential direction on a side of a tread portion larger than lengths in the tire circumferential direction on sides of bead portions. In order to cancel such a difference, the ply pieces adjacent in the tire circumferential direction are overlapped in areas between sidewall portions and bead portions. In overlapping portions of the ply pieces configured as such, code density of the carcass cords is relatively increased, therefore, binding force of the carcass ply is partially increased. Due to such a partial increase in the binding force, it is possible that poor appearance such as a dent (depression) tends to occur on an outer surface of the tire when the tire is inflated. Especially, poor appearance tends to be remarkable in the sidewall portions where rubber volume is small.

The present invention was made in view of the above, and a primary object thereof is to provide a pneumatic tire capable of suppressing poor appearance by the ply pieces in which a diameter (Ce) of at least one of the carcass cords arranged in at least one of side edge portions in the tire circumferential direction is smaller than a diameter (Cc) of at least one of the carcass cords arranged in a center portion of each of the ply pieces.

In one aspect of the present invention, a pneumatic tire comprises a carcass comprising at least one carcass ply extending between bead portions via sidewall portions and a tread portion, the at least one carcass ply comprising a plurality of strip-shaped ply pieces arranged in a tire circumferential direction wherein each of the strip-shaped ply pieces is longer in a tire radial direction than in the tire circumferential direction, each of the ply pieces comprising a plurality of carcass cords arranged in parallel in the tire radial direction and at least partly overlapping each other with the ply pieces adjacent in the tire circumferential direction, and at least one of the carcass cords arranged in at least one of side edge portions in the tire circumferential direction of each of the ply pieces having a diameter (Ce) smaller than a diameter (Cc) of at least one of the carcass cords arranged in a center portion of each of the ply pieces.

In another aspect of the invention, it is preferred that at least one of the carcass cords arranged in both of the side edge portions in the tire circumferential direction of each of the ply pieces has the diameters (Ce) smaller than the diameters (Cc) of at least one of the carcass cords arranged in the center portion of each of the ply pieces.

In another aspect of the invention, it is preferred that in the at least one of the side edge portions, a plurality of carcass cords having the diameter (Ce) is arranged.

In another aspect of the invention, it is preferred that in both of the side edge portions, a plurality of carcass cords having the smaller diameter (CO is arranged.

In another aspect of the invention, it is preferred that a ratio cc/ce of the diameters (Cc) and (Ce) is in a range of from 1.2 to 2.0.

In another aspect of the invention, it is preferred that an average of the diameters of three carcass cords arranged closest to the at least one of the side edge portions smaller than an average of the diameters of the carcass cords other than the three carcass cords.

In another aspect of the invention, it is preferred that the diameters of the carcass cords arranged in the at least one of the side edge portions gradually increase from the at least one of the side edge portions to the center portion.

In another aspect of the invention, it is preferred that each of the ply pieces has pitches (Pe) between the carcass cords arranged in the at least one of the side edge portions larger than pitches (Pc) between the carcass cords arranged in the center portion.

In another aspect of the invention, it is preferred that each of the ply pieces has the pitches (Pe) between the carcass cords arranged in both of the side edge portions larger than the pitches (Pc) of the carcass cords arranged in the center portion.

In another aspect of the invention, it is preferred that an average of the pitches (Pe) of three carcass cords arranged closest to the at least one of the side edge portions larger than an average of the pitches (Pc) of the carcass cords other than the three carcass cords.

In another aspect of the invention, it is preferred that the pitches (Pe) gradually decrease from the at least one of the side edge portions to the center portion.

DESCRIPTION OF THE PREFERRED EMBODIMENT

An embodiment of the present invention will now be described in detail.

Figure 1:
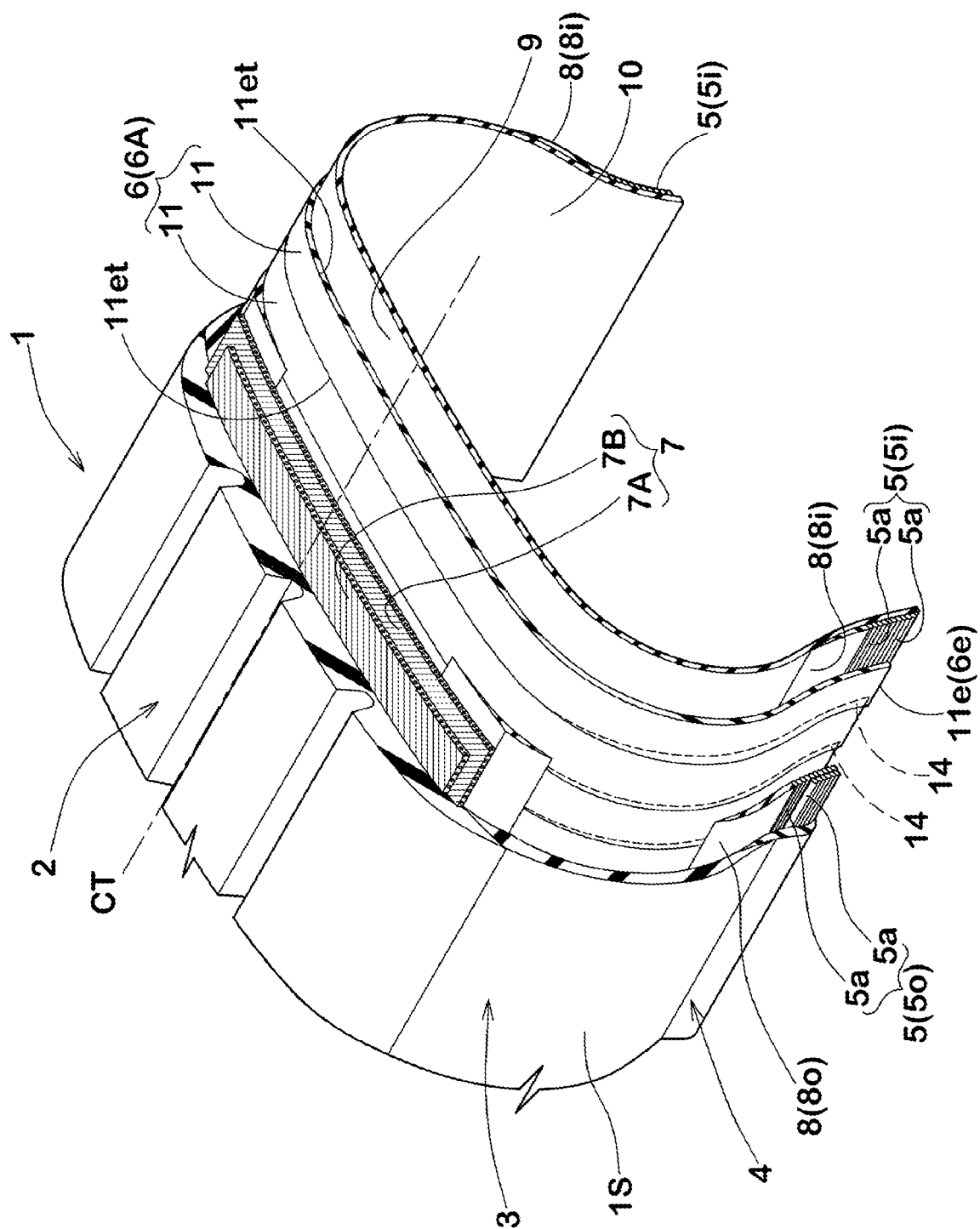
FIG. 1 is a perspective view of a pneumatic tire as an embodiment of the present invention.

FIG. 1 is a perspective view showing a pneumatic tire (hereinafter may be referred to simply as "tire") 1 in this embodiment. The tire 1 in this embodiment is configured as a tire for a passenger car. The tire 1 includes a carcass 6 extending between bead cores 5 of bead portions 4 via sidewall portions 3 and a tread portion 2, and a belt layer 7 provided on an outer side of the carcass 6 in a tire radial direction and inside of the tread portion 2. Further, an inner liner rubber 9 forming an inner cavity surface 10 of the tire 1 is provided on an inner side of the carcass 6.

The carcass 6 comprises at least one (one in this embodiment) carcass ply 6A. The carcass ply 6A is provided with carcass cords arranged at an angle in a range of from 75 to 90 degrees, for example, with respect to a tire equator CT. The carcass ply 6A in this embodiment extends in a toroidal manner between the bead portions 4 via a pair of the sidewall portions 3 and the tread portion 2 disposed therebetween. The carcass ply 6A in this embodiment includes inner ends 6e in the tire radial direction terminating without being turned up in the bead portions 4. For example, organic fiber cords such as polyester or steel cords are used as the carcass cords.

Figure 2:
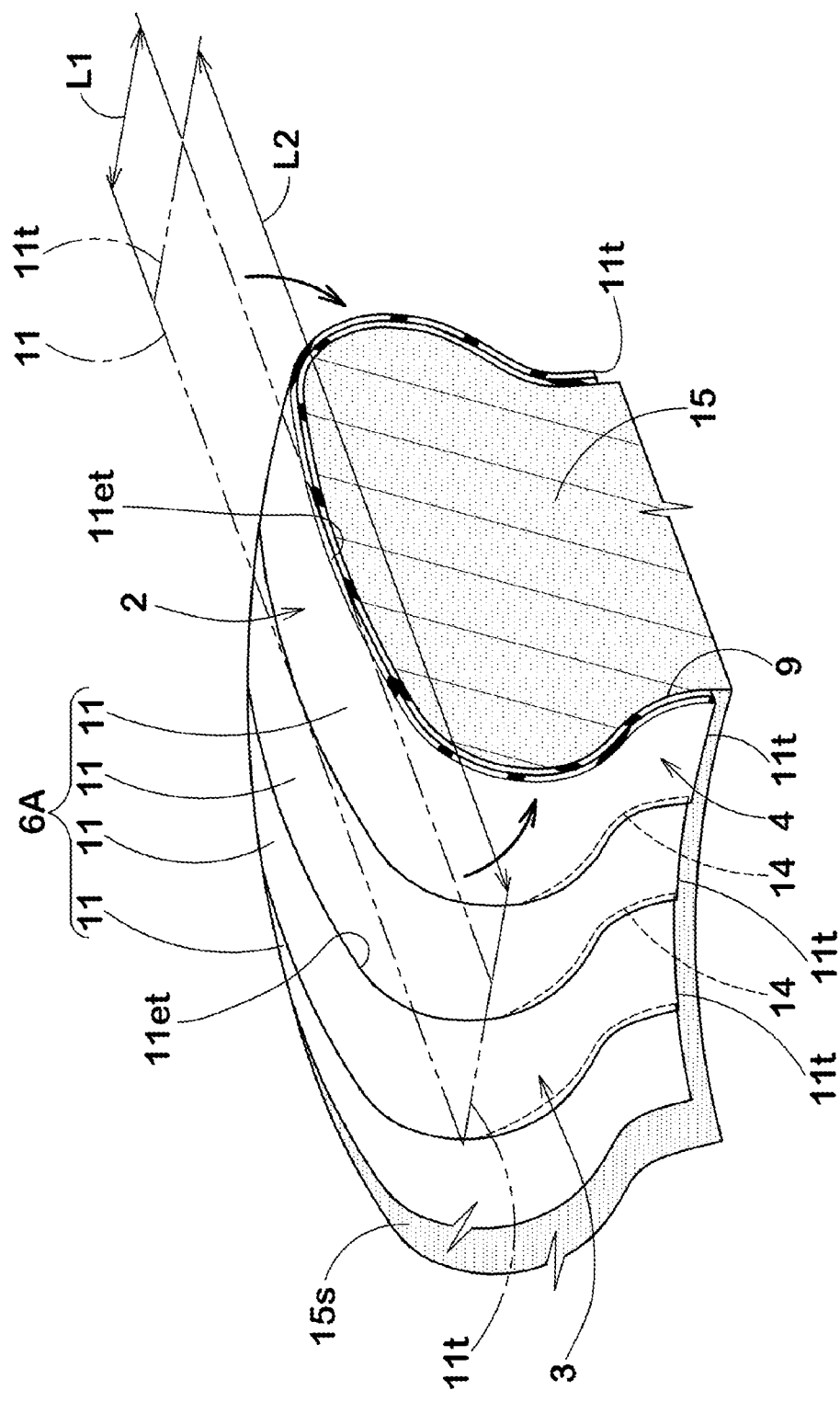
FIG. 2 is a perspective view of a rigid core for forming a carcass ply.

FIG. 2 is a perspective view of a rigid core for forming the carcass ply 6A. The carcass ply 6A in this embodiment is formed by quadrangle strip-shaped ply pieces 11 arranged in the tire circumferential direction. Lengths L2 in the tire radial direction of the ply pieces 11 in this embodiment are set to be larger than lengths L1 thereof in the tire circumferential direction. Note that the lengths L1 in the tire circumferential direction and the lengths L2 in the tire radial direction can be appropriately determined according to, for example, a size or the like of the tire 1. The lengths L1 in this embodiment in the tire circumferential direction is set to be in a range of, for example, about from 24 to 34 mm. Further, the lengths L2 in the tire radial direction is set to be in a range of, for example, about from 300 to 500 mm.

Figure 3:
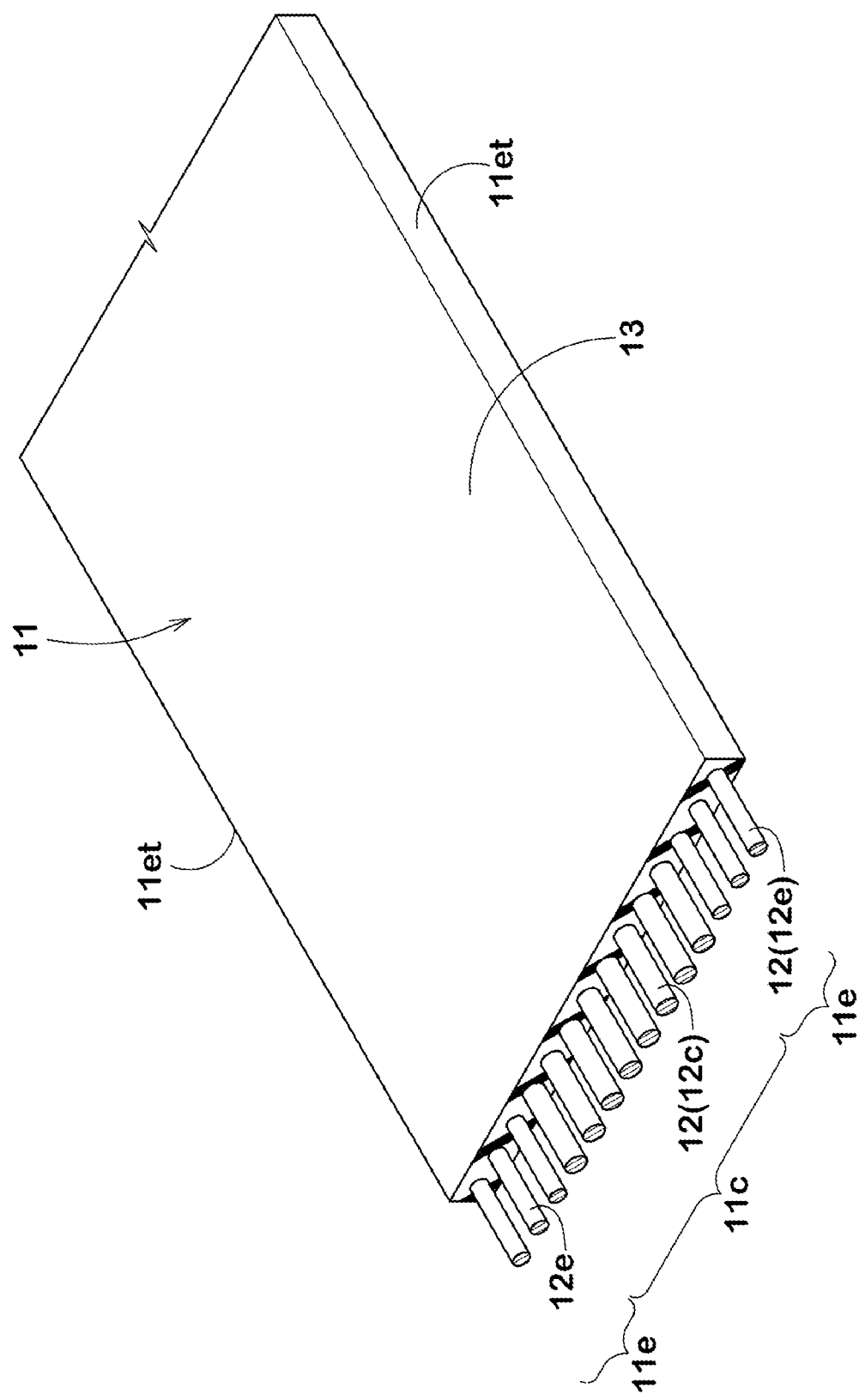
FIG. 3 is a perspective view of a ply piece as an embodiment of the present invention.
Figure 4:
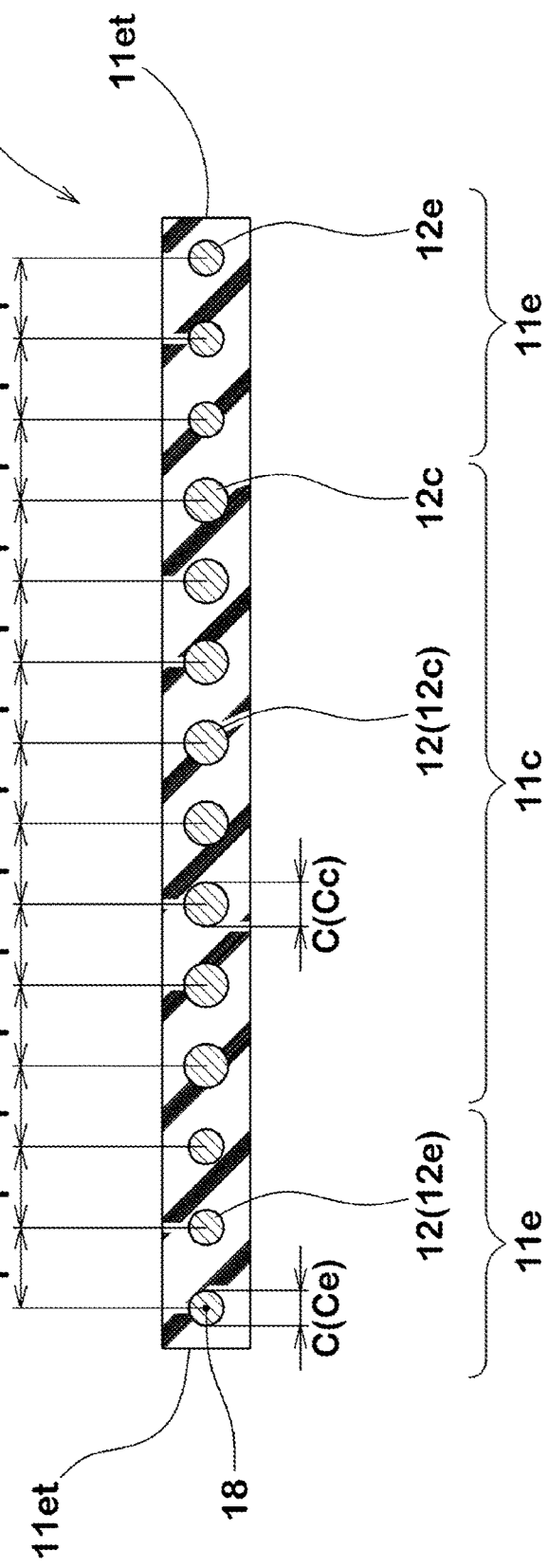
FIG. 4 is a cross-sectional view of the ply piece of FIG. 3.

FIG. 3 is a perspective view of the ply piece 11 in this embodiment. FIG. 4 is a cross-sectional view of the ply piece 11 of FIG. 3. The ply piece 11 includes a plurality of carcass cords 12 arranged in parallel along a longitudinal direction thereof and an unvulcanized topping rubber 13 covering the carcass cords 12. Here, the term "unvulcanized" includes all states that have not reached complete vulcanization, and so-called semi-vulcanized state is included in this "unvulcanized".

The carcass cords 12 in this embodiment are arranged at equal pitches in the tire circumferential direction. As shown in FIG. 4, pitches (P) in the tire circumferential direction of the carcass cords 12 can be appropriately determined based on performances required of the tire 1 (shown in FIG. 1). The pitches (P) in this embodiment are set to be in a range, for example, about from 0.8 to 1.8 mm. Note that the pitches (P) are determined by distances between cord centers 18 of the adjacent carcass cords 12 before the ply piece 11 is attached to a rigid core 15 described later.

The bead cores 5 are each configured to include an inner core 5i and an outer core 5o disposed on sides of the inner ends 6e of the carcass ply 6A. The inner cores 5i are each disposed on an inner side surface in the tire axial direction of the carcass ply 6A. The outer cores 5o are each disposed on an outer side surface in the tire axial direction of the carcass ply 6A. The inner cores 5i are formed by a single bead wire 5a wound in a spiral shape in the tire circumferential direction and the outer cores 5o are formed in the same way.

The inner core 5i is provided on an inner side surface thereof in the tire axial direction with an inner apex rubber 8i. Further, the outer core 5o is provided on an outer side surface thereof in the tire axial direction with an outer apex rubber 8o. These apex rubbers 8i and 8o are formed of hard rubber.

The belt layer 7 comprises two belt plies 7A and 7B. In each of the belt plies 7A and 7B, belt cords are arranged at small angles of, for example, in a range of from 10 to 35 degrees with respect to the tire equator CT. The belt plies 7A and 7B are overlapped so that the belt cords of the belt ply 7A and the belt cords of the belt ply 7B cross each other in the tire radial direction. For the belt cords, for example, steel cords or fiber cords of organic material such as aramid are used.

The inner liner rubber 9 extends between the pair of bead portions 4 in the toroidal shape so as to be disposed substantially over the entire area of the inner cavity surface 10. The inner liner rubber 9 is made of a non-air-permeable butyl rubber.

As shown in FIG. 2, the rigid core 15 is used for manufacturing the tire 1 (carcass ply 6A) in this embodiment. The rigid core 15 has an outer surface 15s that substantially corresponds to a shape of the inner cavity surface 10 of the tire 1 shown in FIG. 1. Thereby, the outer surface 15s of the rigid core 15 is configured to have a length in the tire circumferential direction on a side of the tread portion 2 larger than a length in the tire circumferential direction on a side of the bead portions 4.

In this embodiment, in steps of manufacturing an unvulcanized green tire (not shown), the ply pieces 11 are sequentially attached onto the outer surface 15s of the rigid core 15 in the tire circumferential direction. Thereby, a toroidal carcass ply 6A in which the ply pieces 11 are arranged in the tire circumferential direction is formed. Note that the inner liner rubber 9 is disposed in advance between the carcass ply 6A and the rigid core 15. Thereafter, other tire components are attached, whereby a green tire (not shown) is formed. This green tire is vulcanized together with the rigid core 15. Therefore, the carcass ply 6A in this embodiment is not expanded and deformed.

Adjacent ones of the ply pieces 11 in the tire circumferential direction are arranged so that side edges 11et thereof in the tire circumferential direction are in contact side by side with each other on a side of the tread portion 2. Further, the ply pieces 11 are each overlapped with adjacent ply pieces 11 at least at a part thereof, at least at parts on sides of the side edges 11et at an end portion lit in the tire radial direction in this embodiment. Thereby, the carcass ply 6A is provided with overlapping portions 14 each having a substantially triangular shape in side view in which an adjacent pair of the ply pieces 11 is overlapped.

Owing to the overlapping portions 14 configured as such, it is possible that a difference between length of the rigid core 15 in the tire circumferential direction on the side of the tread portion 2 and lengths of the rigid core 15 in the tire circumferential direction on the side of the bead portions 4 is canceled, therefore, it is possible that the carcass ply 6A is formed in a toroidal shape while suppressing occurrence of wrinkles and the like in the carcass ply 6A.

In each of the overlapping portions 14, the carcass cords 12 (shown in FIG. 3) of the adjacent ply pieces 11 in the tire circumferential direction are overlapped. In the conventional ply piece 11 (shown in FIG. 8), the carcass cords 12 were set to have same diameters (C). Thereby, in the overlapping portions 14, a cord density of the carcass cords 12 were relatively high, therefore, binding force of the carcass 6 was partially increased. Due to the overlapping portions 14 like this, inflation of the carcass ply 6A becomes non-uniform when the tire 1 (shown in FIG. 1) is inflated, therefore, a dent (depression) is formed in an outer surface 1S of the tire 1, which results in poor appearance. In particular, such poor appearance tends to be remarkable and conspicuous in the sidewall portions 3 (shown in FIG. 1) where the rubber volume is small.

As shown in FIG. 4 in this embodiment, a diameter (CO of at least one of the carcass cords 12 (a plurality of carcass cords 12 in this embodiment) arranged in at least one of side edge portions lie (both side edge portions 11e in this embodiment) in the tire circumferential direction of each of the ply pieces 11 are set to be smaller than a diameter (Cc) of at least one of the carcass cords 12 (a plurality of carcass cords 12 in this embodiment) arranged in a center portion 11c of each of the ply pieces 11.

In this specification, the diameter (C) of the carcass cord 12 is defined as total fineness (dtex) when the carcass cord 12 is an organic fiber cord. Further, when the carcass cord 12 is a metal cord, the diameter (C) of the carcass cord 12 is defined as a diameter (mm) including a wire strand bundle.

The side edge portions lie in this embodiment are defined as areas of the ply pieces 11 which include closest three carcass cords 12 to the adjacent side edge net (hereinafter may be simply referred to as "side edge carcass cords 12e"). Note that the number of the side edge carcass cords 12e can be appropriately changed according to sizes in the tire circumferential direction of the overlapping portions 14 (shown in FIG. 2). Further, the center portion 11c is defined as an area of the ply pieces 11 which includes the carcass cords 12 other than the three side edge carcass cords 12e (hereinafter, may be simply referred to as "center carcass cords 12c").

The diameter (Ce) of each of the side edge carcass cords 12e in this embodiment is set to be the same with each other. Further, the diameter (Cc) of each of the center carcass cords 12c is set to be the same with each other.

Owing to the ply pieces 11 configured as such, the carcass cords 12 having relatively small diameters (Ce) are arranged in at least one, both in this embodiment, of the side edge portions 11e which form the overlapping portions 14 (shown in FIG. 2). Thereby, it is possible to prevent the binding force of the carcass ply 6A from partially increasing in the overlapping portions 14 where the code density is partially increased. Therefore, it is possible to suppress variations in the binding force of the carcass ply 6A between the overlapping portions 14 and portions other than the overlapping portions 14, thereby, it is possible that the carcass ply 6A is uniformly expanded when the tire 1 (shown in FIG. 1) is inflated. Thereby, it is possible that occurrence of poor appearance of the tire 1 such as a bulge and/or a dent on the outer surface is of the tire 1 shown in FIG. 1. Further, the center carcass cords 12c having the diameters (Cc) larger than the diameters (Ce) of the side edge carcass cords 12e are arranged in the center portion 11c which does not form the overlapping portions 14, therefore, various performances of the tire 1 including steering stability are not deteriorated.

Note that the overlapping portions 14 are not formed in the tread portion 2 where the side edges 11et adjacent in the tire circumferential direction of the ply pieces 11 are in contact side by side. Thereby, the binding force of the carcass ply 6A varies in the tread portion 2. However, in the tread portion 2, a tread rubber thicker than the belt plies 7A and 7B and sidewall rubbers is provided on an outer side in the tire radial direction of the carcass ply 6A. Thereby, poor appearance of the tire 1 such as a bulge and/or a dent does not occur in the tread portion 2.

In order to effectively exert the above effects, it is preferred that a ratio Cc/Ce of the diameters (Cc) of the center carcass cords 12c and the diameters (Ce) of the side edge carcass cords 12e is set to be in a range of from 1.2 to 2.0. If the ratio Cc/Ce is less than 1.2, it is possible that the partial increase of the binding force of the overlapping portions 14 is not sufficiently prevented. On the contrary, if the ratio Cc/Ce is greater than 2.0, the binding force of the overlapping portions 14 becomes small, therefore, it is possible that a bulge (protrusion) tends to occur at that portion. From this viewpoint, the ratio Cc/Ce is more preferably not less than 1.4, and more preferably not greater than 1.8.

If the carcass cords 12 are organic fiber cords (for example, nylon cords, rayon cords, or polyester cords), it is preferred that the diameters (total fineness) (Ce) of the side edge carcass cords 12e are set to be in a range of from about 1880 dtex (940 dtex/2) to about 2520 dtex (1260 dtex/2). It is preferred that the diameters (total fineness) (Cc) of the center carcass cords 12c are set to be in a range of from about 2800 dtex (1400 dtex/2) to about 4200 dtex (2100 dtex/2).

If the carcass cords 12 are steel cords, it is preferred that the diameters (Ce) of the side edge carcass cords 12e are set to be in a range of from about 0.59 to about 1.04 mm. It is preferred that the diameters (Cc) of the center carcass cords 12c are set to be in a range of from about 0.87 to about 1.86 mm.

The diameters (Ce) of the side edge carcass cords 12e in this embodiment are set to be the same with each other, and the diameters (Cc) of the center carcass cords 12c in this embodiment are set to be the same with each other. However, the present invention is not limited thereto. As long as an average of the diameters (Ce) of the side edge carcass cords 12e (in this embodiment, three carcass cords 12 arranged closest to at least one of the side edges 11 et of each of the ply pieces 11) is smaller than an average of the diameters (Cc) of the center carcass cords 12c (in this embodiment, the carcass cords other than the three carcass cords 12 arranged closest to the side edge 11 et), the diameter (Ce) of each of the side edge carcass cords 12e may be different from each other, and the diameter (Cc) of each of the center carcass cords 12c may be different from each other, for example. The ply piece 11 configured as such can also prevent the biding force from partially increasing in the overlapping portions 14.

Figure 5:
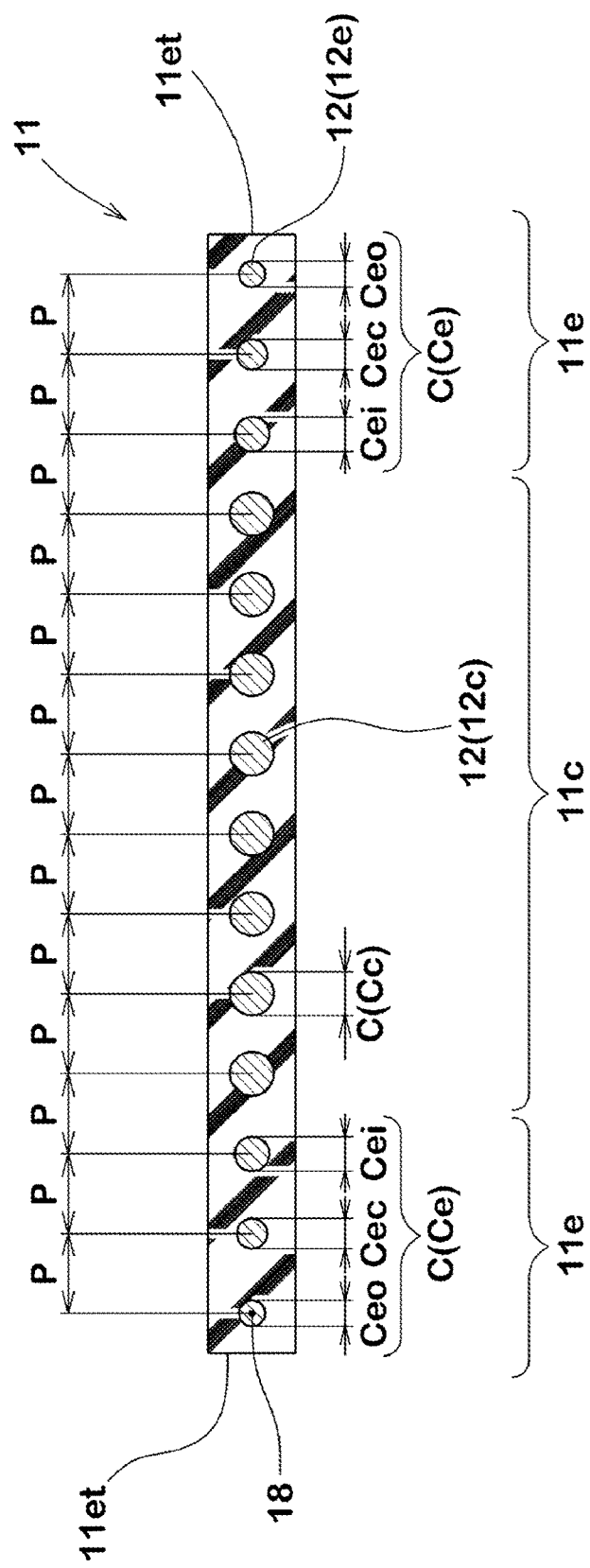
FIG. 5 is a cross-sectional view of a ply piece as another embodiment of the present invention.

As shown in FIG. 2, each of the overlapping portions 14 in this embodiment is formed in a substantially triangular shape in a side view. Thereby, among the side edge carcass cords 12e, the side edge carcass cord 12e disposed on a side of the center portion 11c has a smaller overlapping ratio than the side edge carcass cords 12e disposed on the sides of the side edges 11et. Thereby, it is preferred that the diameters of the side edge carcass cords 12e gradually increase from at least one, preferably both, of the side edges 11et toward the center portion 11c of each of the ply pieces 11. FIG. 5 is a cross-sectional view showing the ply piece 11 according to another embodiment of the present invention.

The diameters (Ce) (a first diameter (Ceo), a second diameter (Cec), a third diameter (Cei)) of the side edge carcass cords 12e and the diameters (Cc) of the center carcass cords 12c in this embodiment satisfy the following expression.

$$Ceo<Cec<Cei<Cc$$

Owing to the ply pieces 11 configured as such, it is possible that the diameters (Ce) of the side edge carcass cords 12e arranged on the side of the center portion 11c where the proportion disposed in the overlapping portion 14 (shown in FIG. 2) is small are set to be relatively large, therefore, it is possible that to effectively suppress unevenness in the binding force of the carcass ply 6A between the overlapping portions 14 and portions other than the overlapping portions 14 at the side edge portions 11e of each of the ply pieces 11. Thereby, it is possible that the carcass ply 6A is uniformly expanded when the tire 1 (shown in FIG. 1) is inflated. In this case, it is preferred that the average of the diameters (Cc) of the center carcass cords 12c is set to be in a range of from 1.2 to 2.0 times the average of the diameters (Ce) of the side edge carcass cords 12e.

In order to effectively exert the above-described effects, it is preferred that the diameter (Ce) (the first diameter (Ceo), the second diameter (Cec) or the third diameter (Cei)) of one of the side edge carcass cords 12e is set to be in a range of from 0.6 to 0.8 times the diameter (C) of the carcass cord 12 adjacent thereto on the side of the center portion 11c (the second diameter (Cec), the third diameter (Cei) of the side edge carcass cord 12e or the diameter (Cc) of the center carcass cord 12c, respectively). Thereby, it is possible that the diameters of the side edge carcass cords 12e increase gradually and smoothly from at least one, both in this embodiment, of the side edges net toward the center portion 11c of each of the ply piece 11, therefore, it is possible to prevent the variation in the biding force of the at least one, both in this embodiment, of the side edge portions 11e, thereby, it is possible that occurrence of the poor appearance is prevented.

Figure 6:
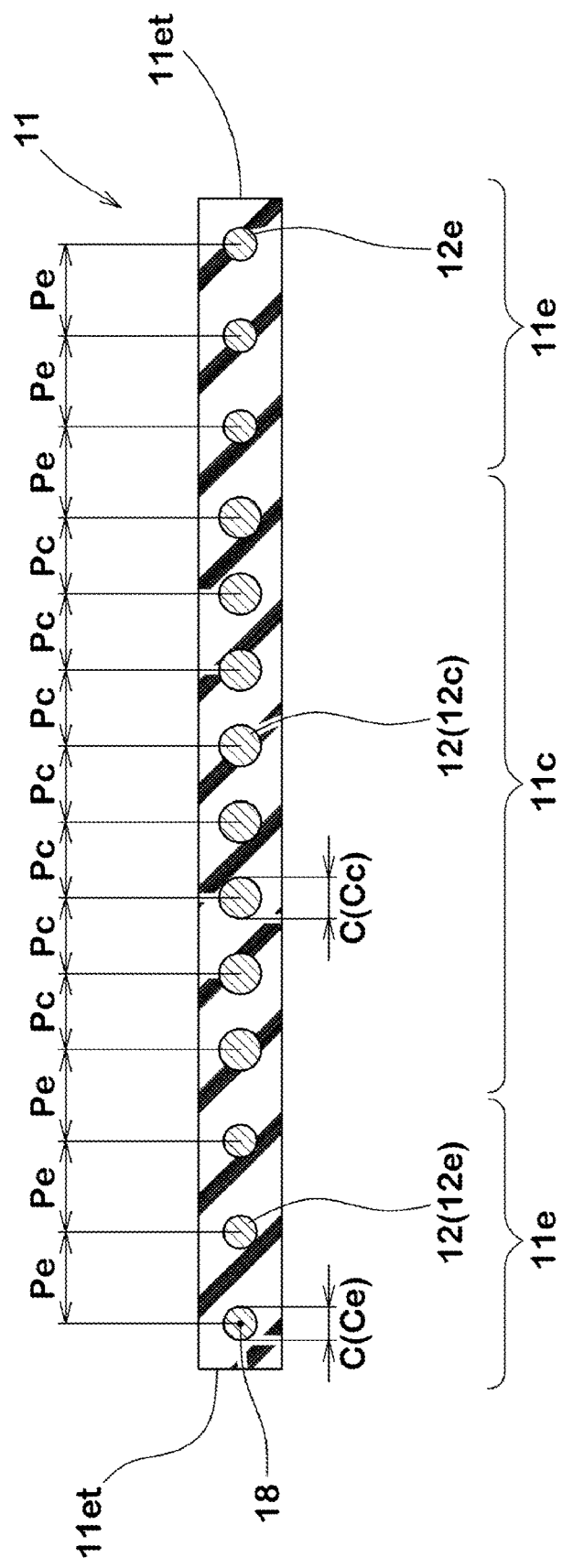
FIG. 6 is a cross-sectional view of a ply piece as yet another embodiment of the present invention.

In the carcass plies 6A according to the embodiments described so far, the pitches (P) between the carcass cords 12 are set to be equal. However, the present invention is not limited thereto. As long as the diameters (Ce) of the side edge carcass cords 12e are set to be smaller than the diameters (Cc) of the center carcass cords 12c, the pitches (P) may vary. FIG. 6 is a cross-sectional view showing the ply piece 11 according to yet another embodiment of the present invention.

The pitches (P) of the side edge carcass cords 12e arranged in at least one, both in this embodiment, of the side edge portions 11e are set to be larger than the pitches (Pc) of the center carcass cords 12c of each of the ply pieces 11 in this embodiment. Note that the pitches (Pe) of the side edge carcass cords 12e in the side edge portions 11e are set to be the same. Further, the pitches (Pc) of the center carcass cords 12c in the center portion 11c are set to be the same.

According to the ply pieces 11 configured as such, the carcass cords 12 having the relatively small diameters (Ce) (side edge carcass cords 12e) are arranged in the side edge portions 11e, therefore, it is possible that the code density of the side edge portions 11e is relatively low. Thereby, it is possible that the code density of the overlapping portions 14 (shown in FIG. 2) is prevented from increasing, therefore, it is possible that the binding force of the overlapping portions 14 is prevented from partially increasing. Thereby, it is possible that variation is suppressed in the binding force of the carcass ply 6A between the overlapping portions 14 and the portions other than the overlapping portions 14, therefore, it is possible that occurrence of poor appearance such as a bulge and/or a dent on the outer surface is of the tire 1 shown in FIG. 1 is prevented. Further, pitches (Pc) of the center carcass cords 12c of the center portion 11c where the overlapping portions 14 are not formed are set to be smaller than the pitches (Pe) of the side edge carcass cords 12e, therefore, various performances including the steering stability of the tire 1 are not deteriorated.

Note that the overlapping portions 14 are not formed in the tread portion 2 where each of the side edges 11et of each of the ply pieces 11 is in contact side by side with one of the side edges 11et adjacent thereto in the tire circumferential direction of the ply pieces 11. Thereby, the pitches (P) of the carcass cords 12 vary in the tread portion 2. However, the tread portion 2 is provided with the belt plies 7A and 7B and the tread rubber on the outer side in the tire radial direction of the carcass ply 6A, therefore, poor appearance of the tire 1 such as a bulge and/or a dent does not occur.

In order to effectively exert the above effects, it is preferred that a ratio Pe/Po of the pitches (Pe) of the center carcass cords 12c and the pitches (Pe) of the side edge carcass cords 12e is set to be in a range of from 1.2 to 2.0. If the ratio Pe/Po is less than 1.2, it is possible that the code density of the overlapping portions 14 is not prevented from increasing. Conversely, if the ratio Pe/Pc is greater than 2.0, the cord density of the overlapping portions 14 becomes small, therefore, it is possible that a bulge (protrusion) tends to occur in that portion. From this viewpoint, the ratio Pe/Pc is more preferably not less than 1.4, and more preferably not greater than 1.8.

The pitches (Pe) between the side edge carcass cords 12e in this embodiment are set to be the same and the pitches (Pc) between the center carcass cords 12c in this embodiment are set to be the same, but the present invention is not limited thereto. For example, as long as the average of the pitches (Pe) of the side edge carcass cords 12e (the three carcass cords 12 arranged closest to each of the side edges 11et of each of the ply pieces 11 in this embodiment) is set to be greater than the average of the pitches (Pc) of the center carcass cords 12c (the carcass cords other than the three carcass cords 12 arranged closest to each of the side edges 11et in this embodiment), the pitches (Pe) of the side edge carcass cords 12e may be different from each other. Further, the pitches (Pc) of the center carcass cords 12c may be different from each other. According to the ply pieces 11 configured as such, it is also possible that the biding force is prevented from partially increasing in the overlapping portions 14.

Figure 7:
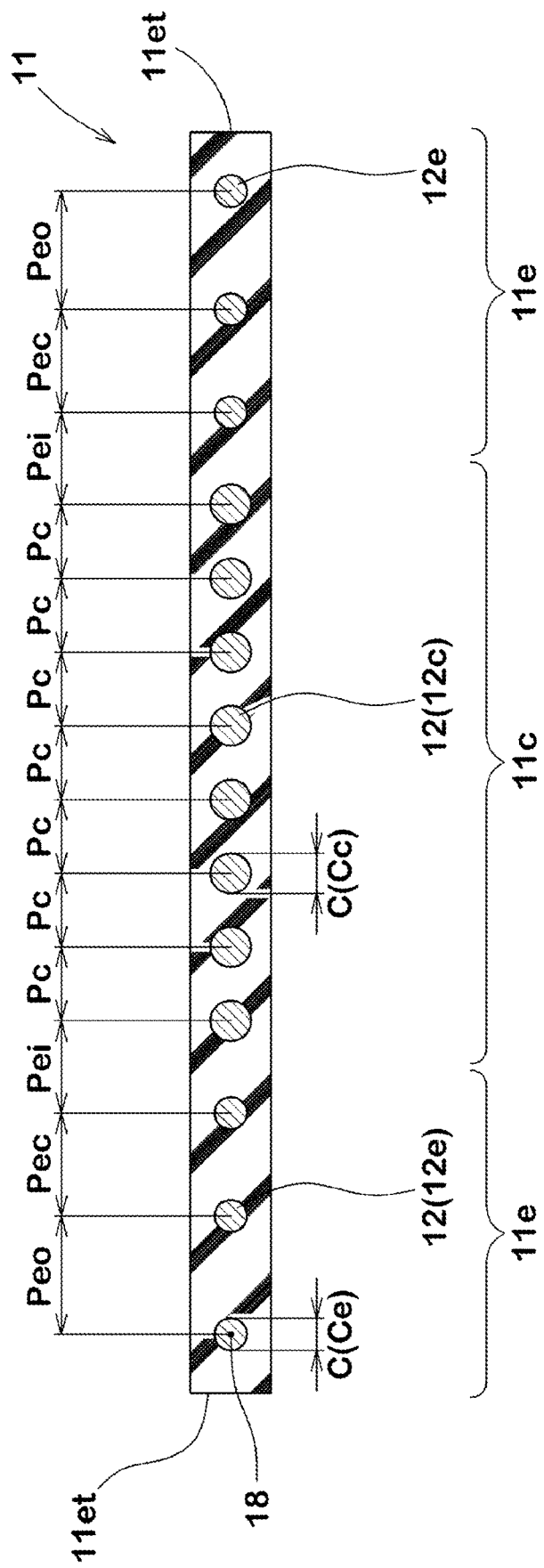
FIG. 7 is a cross-sectional view of a ply piece as yet another embodiment of the present invention.

As described above, among the side edge carcass cords 12e, the side edge carcass cords 12e arranged on the side of the center portion 11c have smaller portions thereof arranged in the overlapping portions 14 (shown in FIG. 2) than the side edge carcass cords 12e arranged on the side of the side edge 11et. Thereby, it is preferred that the pitches (Pe) of the side edge carcass cords 12e gradually decrease from at least one, preferably both, of the side edges 11et toward the center portion 11c of each of the ply pieces 11. FIG. 7 is a cross-sectional view showing the ply piece 11 according to yet another embodiment of the present invention.

The pitches (Pe) (a first pitch (Peo), the second pitch (Pec), a third pitch (Pei)) of the side edge carcass cords 12e and the pitches (Pc) of the center carcass cords 12c in this embodiment satisfy the following expression.

$$Peo>Pcc>Pei>Pc$$

Owing to the ply pieces 11 configured as such, it is possible that the variation in the cord density of the carcass cords 12 between the overlapping portions 14 (shown in FIG. 2) and portions other than the overlapping portions 14 in the side edge portions 11e is effectively prevented. Thereby, when the tire 1 (shown in FIG. 1) is inflated, it is possible that the carcass ply 6A is uniformly expanded. In this case, it is preferred that the average of the pitches (Pe) of the side edge carcass cords 12e is set to be in a range of from 1.2 to 2.0 times the average of the pitches (Pc) of the center carcass cords 12c.

In order to effectively exert the above-described effects, it is preferred that the pitches (Pe) (the first pitch (Peo), the second pitch (Pec), or the third pitch (Pei)) of the side edge carcass cords 12e are set to be in a range of 1.1 to 1.2 times the pitches of the carcass cords 12 adjacent thereto on the side of the center portion 11c (the second pitch (Pec), the third pitch (Pei) of the side edge carcass cords 12e or the pitches (Pc) of the center carcass cords 12c, respectively). Thereby, it is possible that the pitches (Pe) of the side edge carcass cords 12e decrease gradually and smoothly from at least one, both in this embodiment, of the side edges 11et toward the center portion 11c of each of the ply piece 11, therefore, it is possible the variation of the cord density of the carcass cords 12 is effectively prevented. Thereby, it is possible that occurrence of the poor appearance of the tire 1 is effectively prevented.

The diameters (Ce) of the side edge carcass cords 12e in this embodiment are set to be the same, but the present invention is not limited thereto. For example, while the pitches (Pe) of the side edge carcass cords 12e are gradually decreased from at least one, preferably both, of the side edges 11et toward the center portion 11c of each of the ply pieces 11, the diameters (Ce) of the side edge carcass cords 12e may be decreased from at least one, preferably both, of the side edges 11et toward the center portion 11c of each of the ply pieces 11. Thereby, it is possible that the diameters of the side edge carcass cords 12e arranged on the side of the center portion 11c, where the proportion disposed in the overlapping portions 14 is relatively small, are relatively large and it is possible that unevenness in the cord density of the side edge carcass cords 12e between the overlapping portions 14 and the portions other than the overlapping portions 14 is effectively prevented, therefore, it is possible that the carcass ply 6A is expanded uniformly when the tire 1 (shown in FIG. 1) is inflated.

While detailed description has been made of the pneumatic tire as an especially preferred embodiment of the present invention, the present invention can be embodied in various forms without being limited to the illustrated embodiment.

Working Example (Example)

Embodiment A

Tires (examples 1 to 7) having the basic structure shown in FIG. 1 and the ply pieces according to the specifications listed in table 1 were made by way of test and then the test tires were evaluated for appearance thereof. In the tire of Example 7, the diameters (Ce) of the carcass cords arranged in the side edge portions are gradually increased from the side edges toward the center portion of each of the ply pieces.

Figure 8:
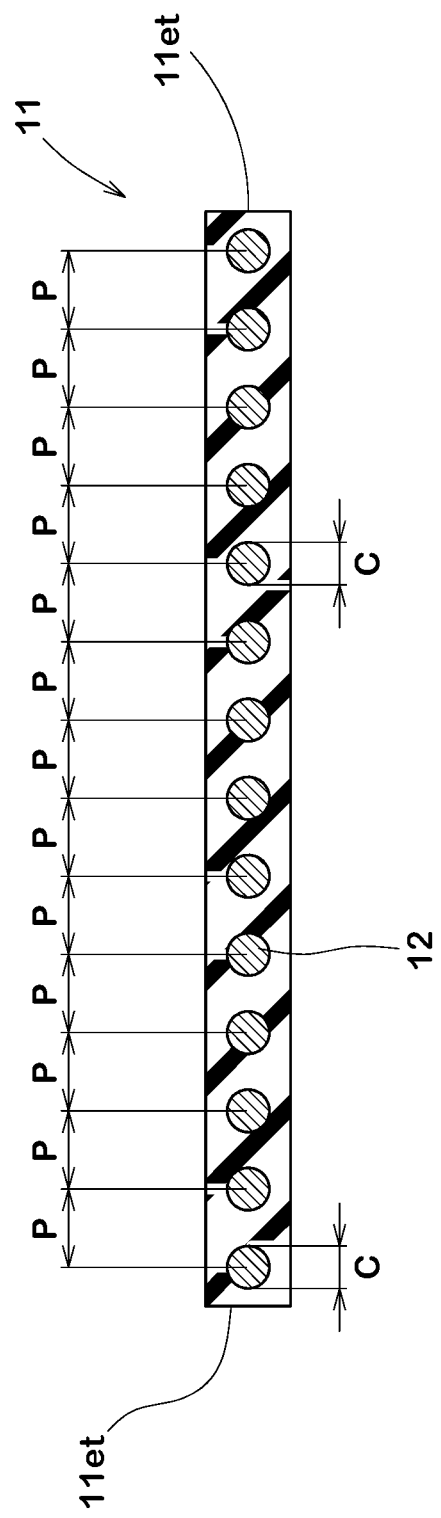
FIG. 8 is a cross-sectional view of a conventional ply piece in which diameters of carcass cords are equal and pitches therebetween are equal.

For comparison, conventional tires (references 1 to 3) provided with the ply pieces in which the diameters of the carcass cords are the same with each other as shown in FIG. 8 and tires (references 4 to 6) provided with the ply pieces having the diameters (Ce) of the carcass cords arranged in the side edge portions larger than the diameters (Cc) of the carcass cords arranged in the center portion of each of the ply pieces were also made by way of test and evaluated in the same manner.

Common specifications are as follows. The pitches (P) between the carcass cords of each of the examples and the references are set to be the same. Note that in Example 7 of Table 1, "structure of carcass cords in side edge portion" and "diameters (Ce) of carcass cords in side edge portion" are indicated by an average value of the first diameter (Ceo), the second diameter (Cec), and the third diameter (Cei).

Tire size: 195/65R15
Rim size: 15×6J
Thickness of sidewall portion: 1.5 mm
Ply piece:
circumferential length L1: 28 mm
Radial length L2: 390 mm
Carcass cord:
Material: Polyester
Pitch (P): 1.3 mm
Number of carcass cords in side edge portion: 3
The test method is as follows.

<Appearance of Tire>

Each of the test tires was mounted on the rim, inflated to an inner pressure of 300 kPa, visually checked for poor appearance such as a dent from the sidewall portions to the bead portions, and the appearance of the test tires was evaluated. The evaluation grades are as follows, wherein the tires of the grades S, A, B, C and D do not become a problem in the market.

s: no poor appearance was observed.

A: poor appearance could not be found without a careful touch on the sidewall portion.

B: poor appearance could not be found without a touch on the sidewall portion.

C: poor appearance could not be found by a visual inspection, but could be found relatively easily by touching the sidewall portion.

D: poor appearance could not be found without careful visual inspection of the sidewall portion.

E: poor appearance could be found by visual inspection of the sidewall portion.

F: poor appearance could be easily found by visual inspection of the sidewall portion.

The test results are shown in Table 1.

TABLE 1

|  | Ref. 1 | Ref. 2 | Ref. 3 | Ex. 1 | Ex. 2 | Ex. 3 | Ex. 4 | Ex. 5 | Ref. 4 | Ref. 5 | Ref. 6 | Ex. 6 | Ex. 7 |
|---|---|---|---|---|---|---|---|---|---|---|---|---|---|
| Figure showing cross section of ply piece | FIG. 8 | FIG. 8 | FIG. 8 | FIG. 4 | FIG. 4 | FIG. 4 | FIG. 4 | FIG. 4 | — | — | — | FIG. 4 | FIG. 5 |
| Side edge portion with carcass cords having larger diameters than those in center portion | — | — | — | both | both | both | both | both | — | — | — | one | both |

TABLE 1-continued

| | | Ref. 1 | Ref. 2 | Ref. 3 | Ex. 1 | Ex. 2 | Ex. 3 | Ex. 4 | Ex. 5 | Ref. 4 | Ref. 5 | Ref. 6 | Ex. 6 | Ex. 7 |
|---|---|---|---|---|---|---|---|---|---|---|---|---|---|---|
| Structure of carcass cords in center portion | [dtex] | — | — | — | 2200/2 | 2200/2 | 2200/3 | 1670/3 | 1670/2 | 1670/2 | 1100/2 | 1100/2 | 1670/2 | 2200/2 |
| Structure of carcass cords in side edge portion | [dtex] | — | — | — | 1670/2 | 1100/2 | 1100/2 | 1100/2 | 1100/2 | 2200/2 | 2200/2 | 1670/2 | 1100/2 | 1100/2 |
| Diameters (Cc) of carcass cords in center portion | [total fineness dtex] | — | — | — | 4400 | 4400 | 6600 | 5010 | 3340 | 3340 | 2200 | 2200 | 3340 | 4400 |
| Diameters (Ce) of carcass cords in side edge portion | [total fineness dtex] | — | — | — | 3340 | 2200 | 2200 | 4400 | 2200 | 4400 | 4400 | 3340 | 2200 | 2200 |
| Ratio Cc/Ce | | — | — | — | 1.32 | 2.00 | 3.00 | 1.14 | 1.52 | 0.76 | 0.50 | 0.66 | 1.52 | 2.00 |
| First diameter (Ceo) of carcass cord in side edge portion | [total fineness dtex] | — | — | — | — | — | — | — | — | — | — | — | — | 2000 |
| Second diameter (Cec) of carcass cord in side edge portion | [total fineness dtex] | — | — | — | — | — | — | — | — | — | — | — | — | 2200 |
| Third diameter (Cei) of carcass cord in side edge portion | [total fineness dtex] | — | — | — | — | — | — | — | — | — | — | — | — | 2400 |
| Structure of all carcass cords | [dtex] | 2200/2 | 1670/2 | 1100/2 | — | — | — | — | — | — | — | — | — | — |
| Diameters of all carcass cords | [total fineness dtex] | 4400 | 3340 | 2200 | — | — | — | — | — | — | — | — | — | — |
| Appearance evaluation | [grade]* | D | D | D | B | A | D | C | S | E | F | E | A | S |

*S, A, B, C, and D are good.

From the test results, it was confirmed that the tires of the examples can suppress occurrence of poor appearance.

Embodiment B

Tires (Examples 4, 8 to 12) having the basic structure shown in FIG. 1 and the ply pieces according to the specifications listed in table 2 were made by way of test and then the test tires were evaluated for appearance thereof. In the tire of Example 12, the pitches (Pe) of the carcass cords arranged in the side edge portions are gradually decreased from the side edges toward the center portion of each of the ply pieces. The common specifications are the same as those of the above-described embodiment A except for the pitches (P) of the carcass cords and the following items. Note that in Example 12 of Table 2, "pitches (Pe) of carcass cords of side edge portions" are indicated by an average value of the first pitch (Peo), the second pitch (Pec), and the third pitch (Pei). The test method is also the same as in Embodiment A.

Structure of carcass cords in center portion: 1670 dtex/3
structure of carcass cords in side edge portion: 1100 dtex/2
Diameter (Cc) (total fineness) of carcass cords in center portion: 5010 dtex
Diameter (Ce) (total fineness) of carcass cords in side edge portion: 4400 dtex
Ratio Cc/Ce: 1.14
The test results are shown in Table 2.

TABLE 2

| | Ex. 4 | Ex. 8 | Ex. 9 | Ex. 10 | Ex. 11 | Ex. 12 |
|---|---|---|---|---|---|---|
| Figure showing cross section of ply piece | FIG. 4 | FIG. 6 | FIG. 6 | FIG. 6 | FIG. 6 | FIG. 7 |
| Side edge portion with carcass cords having larger diameters than those in center portion | both | both | both | both | both | both |
| Pitches (Pc) of carcass cords in center portion [mm] | — | 1.24 | 1.22 | 1.16 | 1.10 | 1.22 |

TABLE 2-continued

|  | | Ex. 4 | Ex. 8 | Ex. 9 | Ex. 10 | Ex. 11 | Ex. 12 |
|---|---|---|---|---|---|---|---|
| Pitches (Pe) of carcass cords in side edge portion | [mm] | — | 1.36 | 1.46 | 1.86 | 2.20 | 1.46 |
| Ratio Pe/Pc | | — | 1 | 1 | 1.60 | 2.00 | 1.20 |
| First pitch (Peo) of carcass cords in side edge portion | [mm] | — | — | — | — | — | 1.60 |
| Second pitch (Pec) of carcass cords in side edge portion | [mm] | — | — | — | — | — | 1.46 |
| Third pitch (Pei) of carcass cords in side edge portion | [mm] | — | — | — | — | — | 1.32 |
| Pitches of all carcass cords | [mm] | 1.3 | — | — | — | — | — |
| Appearance evaluation | [grade]* | C | B | A | S | A | S |

*S, A, B, C, and D are good.

From the test results, it was confirmed that the tires (Examples 8 to 12) having the ply pieces in which the pitches (Pe) of the carcass cords of the side edge portions are larger than the pitches (Pc) of the carcass cords of the center portion can suppress occurrence of the poor appearance compared with a tire (Example 4) having the ply pieces in which all the pitches (P) of the carcass cords are set to be the same.

The invention claimed is:

1. A pneumatic tire comprising:
a carcass comprising at least one carcass ply extending between bead portions via sidewall portions and a tread portion, the at least one carcass ply comprising a plurality of strip-shaped ply pieces arranged in a tire circumferential direction wherein each of the strip-shaped ply pieces is longer in a tire radial direction than in the tire circumferential direction;
wherein
each of the ply pieces comprises a plurality of carcass cords arranged in parallel in the tire radial direction and partly overlapping with the ply pieces adjacent in the tire circumferential direction,
each of the ply pieces has two side edge portions in the tire circumferential direction and a center portion connecting the two side edge portions,
the circumferential width of each side edge portion is the circumferential width of the respective overlap,
an average diameter Ce of each carcass cord arranged in at least one of the side edge portions in the tire circumferential direction of each of the ply pieces is smaller than an average diameter Cc of each carcass cord arranged in the center portion of each of the ply pieces,
there is a plurality of the carcass cords arranged in the at least one of the side edge portions,
the diameters of the carcass cords arranged in each ply piece gradually increase from the outermost side edge carcass cord in the at least one of the side edge portions to the respective center carcass cord in the center portion which is adjacent to each of the at least one of the side edge portions, and
in the at least one of the side edge portions of each ply piece, the diameter of each side edge carcass cord is set to be in a range of from 0.6 to 0.8 times the diameter of the carcass cord adjacent thereto on the side of the center portion.

2. The pneumatic tire according to claim 1, wherein the average diameter Ce of each carcass cord arranged in both of the side edge portions in the tire circumferential direction of each of the ply pieces is smaller than the average diameter Cc of each carcass cord arranged in the center portion of each of the ply pieces.

3. The pneumatic tire according to claim 1, wherein the ratio Cc/Ce is in a range of from 1.2 to 2.0.

4. The pneumatic tire according to claim 1, wherein the number of the carcass cords arranged in the at least one of the side edge portions is equal to three.

5. The pneumatic tire according to claim 1, wherein
in each of the ply pieces, there is a plurality of the carcass cords arranged in the center portion, and
an average pitch Pe of the pitches between the carcass cords arranged in the at least one of the side edge portions and of the pitch between the innermost side edge carcass cord in the at least one of the side edge portions and the respective center carcass cord in the center portion, which is adjacent to the respective one of the at least one of the side edge portions, is larger than an average pitch Pc between the carcass cords arranged in the center portion.

6. The pneumatic tire according to claim 5, wherein in each of the ply pieces, the average pitch Pe of the pitches between the carcass cords arranged in both of the side edge portions and the pitch between the innermost side edge carcass cord in each side edge portion and the respective center carcass cord in the center portion which is adjacent to the respective one of the side edge portions is larger than the average pitch Pc between the carcass cords arranged in the center portion.

7. The pneumatic tire according to claim 5, wherein the number of the carcass cords arranged in the at least one of the side edge portions is equal to three.

8. The pneumatic tire according to claim 5, wherein the pitches between the carcass cords arranged in the at least one of the side edge portions and the pitch between the innermost side edge carcass cord in the at least one of the side edge portions and the respective center carcass cord in the center portion which is adjacent to the respective one of the at least one of the side edge portions gradually decrease from the outermost side edge carcass cord in the at least one of the side edge portions to the respective center carcass cord in the center portion which is adjacent to the respective one of the at least one of the side edge portions.

* * * * *